United States Patent [19]

Bhojwani et al.

[11] Patent Number: 4,550,769
[45] Date of Patent: * Nov. 5, 1985

[54] SOLIDS QUENCH BOILER AND PROCESS

[75] Inventors: Arju H. Bhojwani, Chelmsford, Mass.; Herman N. Woebcke, Stamford, Conn.

[73] Assignee: Stone & Webster Engineering Corp., Boston, Mass.

[*] Notice: The portion of the term of this patent subsequent to Sep. 28, 1999 has been disclaimed.

[21] Appl. No.: 375,730

[22] Filed: May 7, 1982

Related U.S. Application Data

[63] Continuation of Ser. No. 82,162, Oct. 5, 1979, Pat. No. 4,351,275.

[51] Int. Cl.$^4$ .............................................. F28D 19/02
[52] U.S. Cl. .................................. 165/1; 165/104.18; 122/4 D; 122/7 R
[58] Field of Search ...................... 165/104.15, 104.16, 165/104.18, 1; 122/4 D, 7 R

[56] References Cited

U.S. PATENT DOCUMENTS

| 2,585,274 | 2/1952 | Reichl | 165/104.16 X |
| 2,698,171 | 12/1954 | Schoenmakers et al. | 165/104.18 X |
| 2,715,018 | 8/1955 | Lapple et al. | 165/104.16 X |
| 3,898,043 | 8/1975 | Schutte et al. | 165/104.16 X |
| 3,952,022 | 4/1976 | Becuwe | 165/104.16 X |
| 4,245,693 | 1/1981 | Cheng | 165/104.16 X |

FOREIGN PATENT DOCUMENTS 3753 1/1977 Japan .............................. 165/104.16

Primary Examiner—Albert W. Davis, Jr.
Attorney, Agent, or Firm—Hedman, Gibson, Costigan & Hoare

[57] ABSTRACT

A process for quenching and cooling reactor effluent is provided. The apparatus utilized to practice the process includes a section for introducing relatively cool particulate solids into a hot effluent stream to effect initial quenching and a section to further cool the composite quenched effluent and solids. The process employs relatively cool particulate solids to quench hot effluent and indirect heat exchange between water and the quenched effluent-solids mix to generate high pressure steam and further cool the mix.

9 Claims, 5 Drawing Figures

SOLIDS QUENCH BOILER AND PROCESS

This is a continuation of application Ser. No. 082,162 filed Oct. 5, 1979 now U.S. Pat. No. 4,351,275 issued Sept. 28, 1982.

BACKGROUND OF THE INVENTION

1. Field of the Invention

The invention relates generally to quenching furnace effluent. More particularly, the invention relates to a process for quenching effluent cracked in a furnace using inert solid particles to provide the reaction heat.

2. Description of the Prior Art

In the technology of thermally cracking hydrocarbon feedstocks to produce olefins, it has long been necessary to stop the reaction of the cracked effluent by rapidly cooling the effluent. Various techniques and apparatus have been provided to facilitate quenching. Both direct quench, wherein a fluid material is introduced directly into the effluent stream, and indirect quench, wherein, heat exchange is performed by heat transfer through the walls separating the hot and cold side of the exchanger are commonly employed. An illustration of the indirect heat exchanger is shown in U.S. Pat. No. 3,583,476 (Herman N. Woebcke et al).

Processes and equipment have been recently developed to crack hydrocarbons in tubular reactors employing solid-gas contact. The solids are essentially inert particulate materials which are heated to high temperatures and intimately mixed with the hydrocarbon feedstock to provide the heat necessary to crack the hydrocarbon.

The existing solid-gas contact processes employing inert particulate solids to provide the heat necessary for reaction typically separate the particulate solids from the gas before quench occurs. An illustration is seen in Patent Application Ser. No. 055148 filed July 6, 1979 (Gartside et al).

However, in the noncatalytic temperature dependant endothermic reaction processes, systems have been developed to quench the entire products stream after the requisite reaction period. The problem is that with heavy feedstocks at high severities, short residence times are desirable. The combination of heavy feedstock, high severity and short residence times impose severe operating problems on the heat recovery devices.

SUMMARY OF THE INVENTION

It is an object of the present invention to provide a solid quench system and apparatus capable of quenching the composite cracked effluent and particulate solids discharged from the reactor fed with heavy feedstocks and operated at high severity and short residence times.

It is another object of the present invention to generate 1,500 psig steam under any operating conditions imposed by the reactor.

It is a further object to provide a solids quench system uniquely suited for rapid quench of furnace effluent generated by noncatalytic temperature dependant endothermic systems utilizing particulate solids to provide the heat for cracking.

Thus, a process has been provided to quench the stream of effluent and particulate solids discharged from a tubular reactor heated by the particulate solids. The process operates to introduce particulate solids into the effluent stream and also pass the effluent-particulate solids mixture in indirect heat exchange relationship with steam. In one embodiment a fluid bed quench riser is used to introduce the additional particulate solids into the stream and a quench exchanger close coupled to the quench riser is provided to effect the indirect heat exchange. The quench exchanger has a plurality of concentrically arrayed tubes extending longitudinally to the exchanger axis over which the stream of effluent and particulate solids pass in indirect heat exchange relationship.

In the process of quenching, the effluent from the reactor with entrained particulate solids enters the fluidized bed quench riser and by an eductor effect draws particulate solids, at a temperature much lower than the effluent temperature, into the quench boiler. The effluent and particulate solids pass in heat exchange relationship with steam in the tubes on the cold side of the quench exchanger and are cooled to the desired quench gas outlet temperature. Concomitantly, high pressure steam is generated in the cold side of the quench exchanger.

Apparatus for separating the particulate solids from the quench gas is provided downstream of the quench exchanger. A return leg for the separated solids to be delivered to the fluidized bed quench riser and outlet for the cracked gas are also included in the system.

In an alternative embodiment the quench riser is not used. The quench boiler is provided with the same plurality of concentrically arrayed longitudinal tubes, however the particulate solids are introduced directly into the reactor outlet tube at the entry end of the quench boiler.

DESCRIPTION OF THE DRAWINGS

The invention will be better understood when viewed with the following drawings wherein.

DESCRIPTION OF THE PREFERRED EMBODIMENT

The solids quench boiler process of the present invention is suitable for use in any application wherein a very rapid rate of quenching is required and the generation of high pressure steam is desirable without accumulation of tar or coke on the boiler tube surface. However, the system is particularly well adapted for use in the Thermal Regenerative Cracking (TRC) process.

Figure 1:
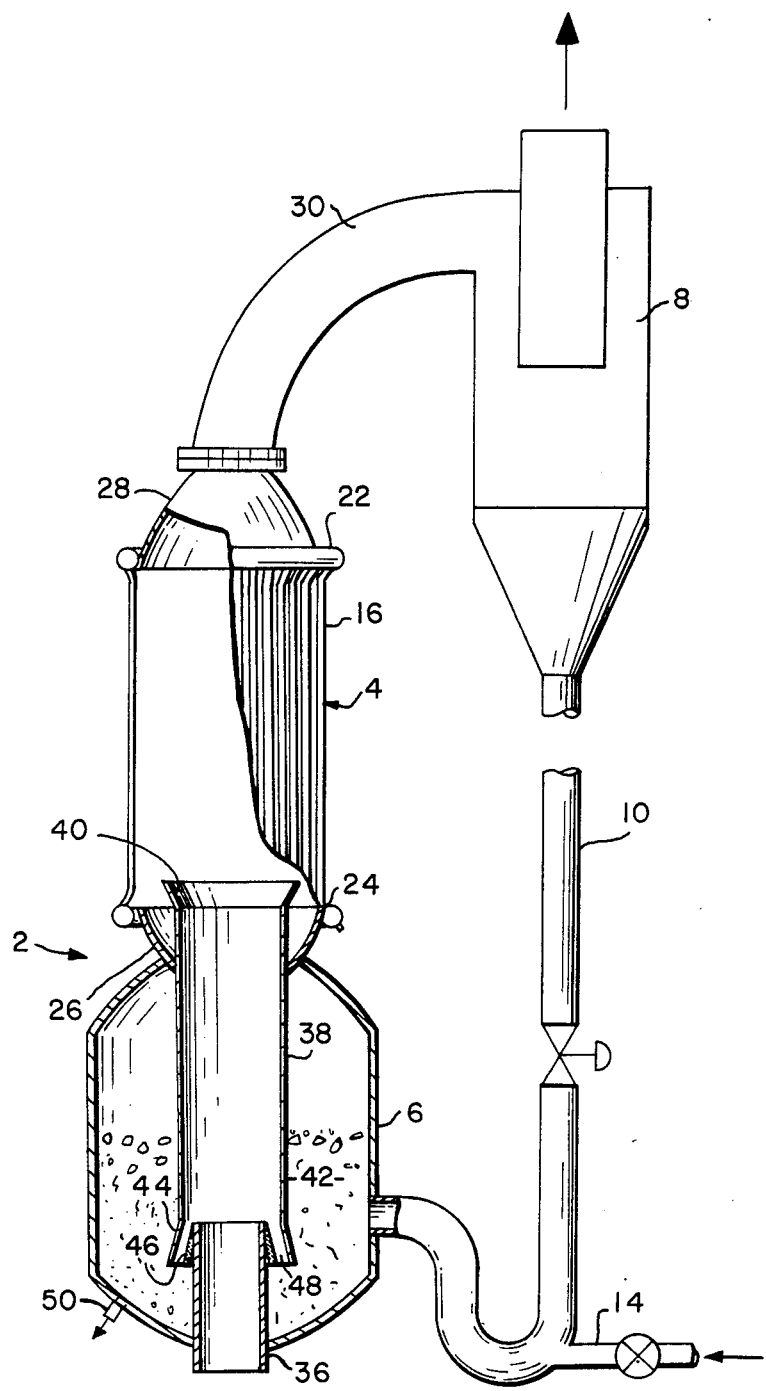
FIG. 1 is a sectional elevational view of the solids quench boiler using the quench riser.

As seen in FIG. 1, the composite solids quench boiler 2 of the invention is comprised essentially of a quench exchanger 4, a fluid bed-quench riser 6, a cyclone separator 8 with a solids return line 10 to the fluid bed-riser 6 and a line 36 for the delivery of gas to the fluid bed-quench riser.

Figure 2:
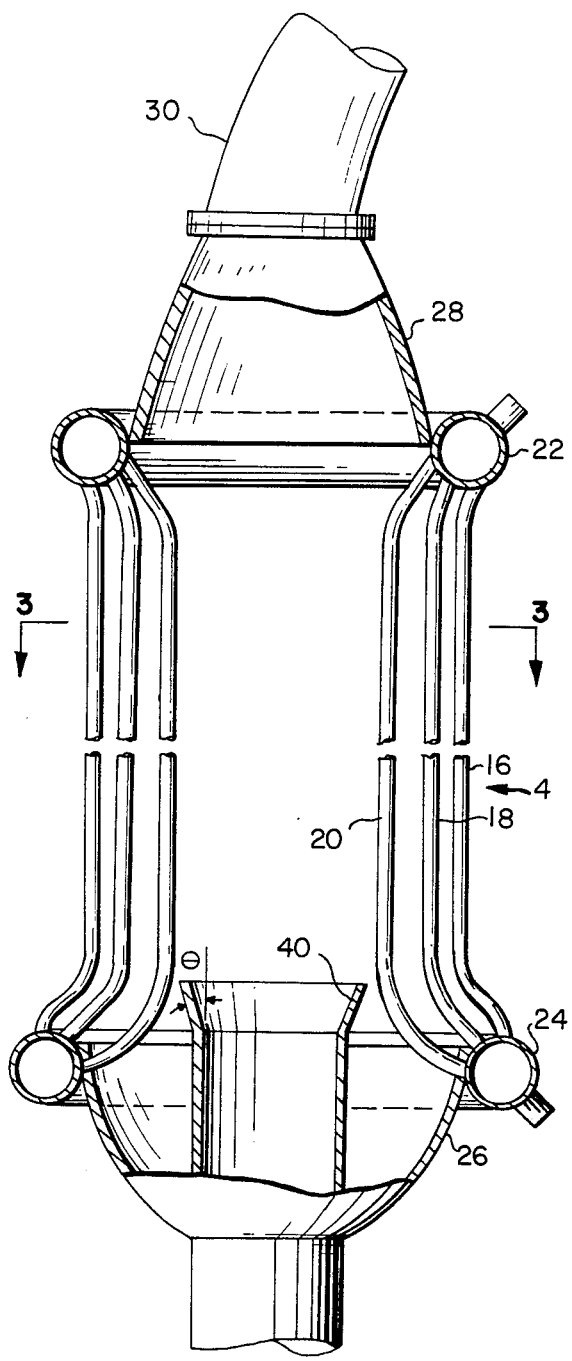
FIG. 2 is a detailed cross sectional elevational view of the quench exchanger of the system.
Figure 3:
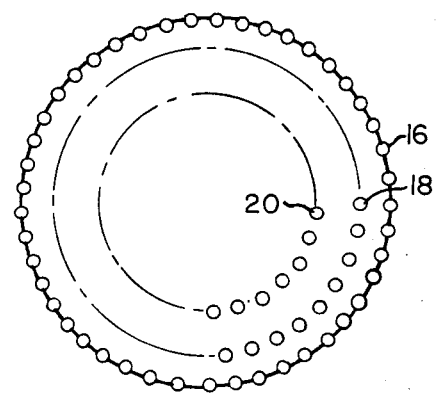
FIG. 3 is a cross sectional plan view taken through line 3—3 of FIG. 2.

The quench exchanger 4 as best seen in FIGS. 2 and 3, is formed with a plurality of concentrically arranged tubes extending parallel to the longitudinal axis of the quench exchanger 4. The outer circle of tubes 16 form the outside wall of the quench exchanger 4. The tubes 16 are joined together, preferably by welding, and form a pressure-tight membrane wall which is, in effect, the outer wall of the quench exchanger 4. The inner circles of tubes 18 and 20 are spaced apart and allow for the passage of effluent gas and particulate solids therearound. The arrays of tubes 16, 18 and 20 are all manifolded to an inlet torus 24 to which boiler feed water is delivered and an upper discharge torus 22 from which high pressure steam is discharged for system service. The quench exchanger 4 is provided with an inlet hood 26 and an outlet hood 28 to insure a pressure tight vessel. The quench exchanger inlet hood 26 extends from the quench riser 6 to the lower torus 24. The quench exchanger outlet hood 28 extends from the upper torus 22 and is connected to the downstream piping equipment by piping such as an elbow 30 which is arranged to deliver the cooled effluent and particulate solids to the cyclone separator 8.

The fluid bed quench riser 6 is essentially a sealed vessel attached in sealed relationship to the quench exchanger 4. The fluid bed-quench riser 6 is arranged to receive the reactor outlet tube 36 which is preferably centrally disposed at the bottom of the fluid quench riser 6. A slightly enlarged centrally disposed tube 38 is aligned with the reactor outlet 36 and extends from the fluid bed-quench riser 6 into the quench exchanger 4. In the quench exchanger 4, the centrally disposed fluid bed-quench riser tube 38 terminates in a conical opening 40. The conical opening 40 is provided to facilitate nonturbulent transition from the quench riser tube 38 to the enlarged opening of the quench exchanger 4. It has been found that the angle of the cone $\theta$, best seen in FIG. 2, should be not greater than 10 degrees.

The fluid bed 42 contained in the fluid bed quench riser 4 is maintained at a level well above the bottom of the quench riser tube 38. A bleed line 50 is provided to bleed solids from the bed 42. Although virtually any particulate solids can be used to provide the quench bed 42, it has been found in practice that the same solids used in the reactor are preferably used in the fluidized bed 42. Illustrations of the suitable particulate solids are FCC alumina solids.

Figure 4:
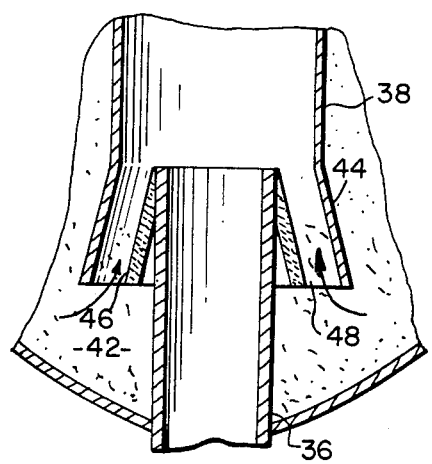
FIG. 4 is a detailed drawing of the reactor outlet and fluid bed quench riser particle entry area.

As best seen in FIG. 4, the opening 48 through which the fluidized particles from the bed 42 are drawn into the quench riser tube 38 is defined by the interior of a cone 44 at the lower end of the quench riser tube 38 and a refractory cone 46 located on the outer surface of the reactor outlet tube 36. In practice, it has been found that the refractory cone 46 can be formed of any refractory material. The opening 48, defined by the conical end 44 of the quench riser tube 38 and the refractory cone 46, is preferably 3–4 square feet for a unit of 50 mmbtu/hr capacity. The opening is sized to insure penetration of the cracked gas solid mass velocity of 100 to 800 pounds per second per square foot is required. The amount of solids from bed 42 delivered to the tube 38 is a function of the velocity of the gas and solids entering the tube 38 from the reactor outlet 36 and the size of the opening 48.

In practice, it has been found that the Thermal Regenerative Cracking (TRC) reactor effluent will contain approximately 2 pounds of solids per pound of gas at a temperature of about 1,400° F. to 1,600° F.

Figure 5:
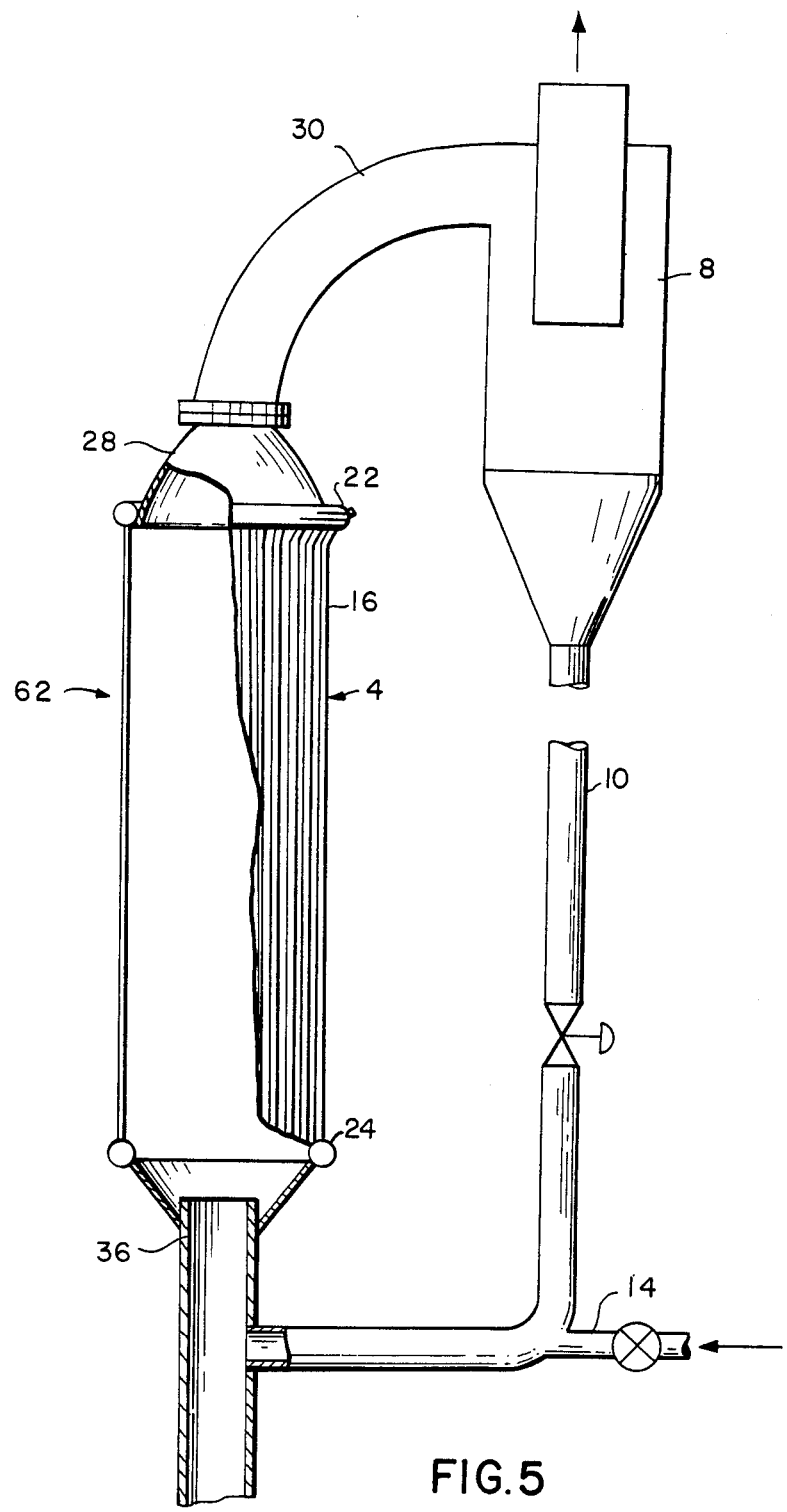
FIG. 5 is a cross-sectional elevational view of the alternative embodiment of the quench exchanger of the invention.

The solids quench boiler 62 shown in FIG. 5 varies structurally from the solids quench boiler 2 of FIGS. 1–4. The solids quench boiler 62 is comprised essentially of an upper torus 22, a lower torus 24 and a plurality of concentrically arranged circles of tubes 16, 18 and 20.

The outer circle of tubes 16 are joined together, preferably by welding, to form a pressure-tight membrane wall which is, in effect, the outer wall of the solids quench boiler 62. The tubes 18 and 20 of the inner circles of tubes are spaced apart to allow the effluent and solids to pass in indirect heat exchange relationship. The reactor outlet tube 36 is connected directly to the solids quench boiler 62. A solids return line 10 from the system separator 8 is arranged to deliver solids directly to the reactor outlet tube 36. A valve 64 is located in the return line 10 to regulate the flow of solids to the reactor outlet tube 36.

The process of the solids quench boiler 2 of FIGS. 1–4 is illustrated by the following example. Effluent from a TRC outlet 36 at about 1,500° F. is delivered to the quench riser tube 38 at a velocity of approximately 40 to 100 feet per second. The ratio of particulate solids to cracked effluent entering or leaving the tube 36 is approximately two pounds of solid per pound of gas at a temperature of about 1,500° F. At 70 to 100 feet per second the particulate solids entrained into the effluent stream by the eductor effect is between twenty five and fifty pounds solid per pound of gas. In 5 milliseconds the addition of the particulate solids from the bed 42 which is at a temperature of 1,000° F. reduces the temperature of the composite effluent and solids to 1,030° F. The gas-solids mixture is passed from the quench riser tube 38 to the quench exchanger 4 wherein the temperature is reduced from 1,030° F. to 1,000° F. by indirect heat exchange with the boiler feed water in the tubes 16, 18 and 20. With 120,000 pounds of effluent per hour, 50 MMBTUs per hour of steam at 1,500 PSIG and 600° F. will be generated for system service. The pressure drop of the gas solid mixture passing through quench exchanger 4 is 1.5 PSI. The cooled gas-solids mixture is delivered through line 30 to the cyclone separator 8 wherein the bulk of the solids is removed from the quenched-cracked gas and returned through line 10 to the quench riser 6.

We claim:

1. A process for quenching reactor effluent in first and second quenching zones comprising the steps of:
   a. passing the effluent from the reactor outlet directly into a quench riser located in the first quenching zone, which quench riser is aligned with the reactor outlet tube;
   b. introducing particulate solids of a lower temperature than the effluent into the effluent stream in the quench riser to partially quench the effluent; and, thereafter,
   c. passing the composite stream of partially quenched effluent and particulate solids into the second quenching zone in indirect heat exchange relationship with a coolant to further quench the composite stream of effluent and particulate solids;
   d. separating the quenched gas from the particulate solids after the effluent and particulate solids have passed in indirect heat exchange relationship with the coolant; and
   e. returning the separated particulate solids for reintroduction to the effluent stream leaving the reactor.

2. A process as in claim 1 wherein the coolant is steam and comprising the further step of generating high pressure steam from the coolant during the heat exchange with effluent and particulate solids.

3. A process as in claim 1 wherein the ratio of particulate solids introduced into the effluent stream to the gas in the stream is 25 to 50 pounds of solid per pound of gas.

4. A process as in claim 3 wherein the particulate solids introduced into the effluent stream reduce the effluent temperature about 470° F. in five milliseconds and the gas-solids mixture is reduced about another 30° F. by indirect heat exchange with the coolant.

5. A process as in claim 4 wherein the effluent from the reactor is about 1500° F.; the temperature of the gas-solids mixture after 5 milliseconds is 1030° F.; the temperature of the gas-solids mixture after indirect heat exchange with the steam coolant is 1000° F. and the high pressure steam generated on the cold side of the heat exchanger is about 600° F. and 1500 psig.

6. A process as in claim 5 wherein the pressure drop through the hot side of the heat exchanger is 1.5 psi.

7. A process as in claim 2 wherein the cold side of the heat exchanger is formed of tubes around which the cracked gas effluent and particulate solids pass in heat exchange relationship.

8. A process as in claim 1 wherein said particulate solids are directed into said stream of effluent by eduction.

9. A process for quenching effluent from a reactor in a solids quench boiler, said solids quench boiler comprising a fluid bed quench riser, particulate solids of a lower temperature than the effluent and disposed in the fluid bed quench riser, a quench exchanger, a plurality of coolant containing heat exchange tubes in said quench exchanger, and a quench riser tube is aligned communication with the outlet tube of the reactor, the fluid bed quench riser and the quench exchanger, the process comprising the steps of:

a. directing a stream of effluent from said reactor into said quench riser tube;

b. introducing by eduction the particulate solids of a lower temperature than the effluent from said fluid bed quench riser into the stream of effluent in said quench riser tube to partially quench the effluent and, thereafter, c. passing the composite stream of partially quenched effluent and particulate solids from said quench riser tube into said quench exchanger and into indirect heat exchange relationship with the coolant in the heat exchange tubes to further quench the composite stream of effluent and particulate solids;

d. separating the quenched gas from the particulate solids after the effluent and particulate solids have passed in indirect heat exchange relationship with the coolant; and e. returning the separated particulate solids to said fluid bed quench riser for reintroduction to the stream of effluent from the reactor.

* * * * *